(12) United States Patent
Yang et al.

(10) Patent No.: US 7,979,791 B2
(45) Date of Patent: Jul. 12, 2011

(54) CROSS-DOMAIN COMMUNICATION

(75) Inventors: Jun Yang, Cupertino, CA (US); Mark E. Stahl, Jersey City, NJ (US); Kevin A. Gibbs, San Francisco, CA (US)

(73) Assignee: Google Inc., Mountain View, CA (US)

( * ) Notice: Subject to any disclaimer, the term of this patent is extended or adjusted under 35 U.S.C. 154(b) by 979 days.

(21) Appl. No.: 11/830,434

(22) Filed: Jul. 30, 2007

(65) Prior Publication Data

US 2009/0037806 A1    Feb. 5, 2009

(51) Int. Cl.
G06F 17/00 (2006.01)
G06F 17/30 (2006.01)

(52) U.S. Cl. ........ 715/234; 715/240; 715/255; 715/760; 709/201; 709/203

(58) Field of Classification Search ............... 715/234
See application file for complete search history.

(56) References Cited

U.S. PATENT DOCUMENTS

| | | |
|---|---|---|
| 2002/0104070 A1 | 8/2002 | Adams |
| 2004/0210536 A1* | 10/2004 | Gudelj et al. ............ 705/64 |
| 2006/0010134 A1* | 1/2006 | Davis et al. ............ 707/10 |
| 2007/0101258 A1* | 5/2007 | Xu et al. ............ 715/516 |
| 2007/0150603 A1* | 6/2007 | Crull et al. ............ 709/227 |
| 2007/0208824 A1* | 9/2007 | Ullman et al. ............ 709/217 |
| 2007/0299857 A1* | 12/2007 | Gwozdz et al. ............ 707/102 |
| 2007/0300064 A1* | 12/2007 | Isaacs et al. ............ 713/168 |
| 2008/0263566 A1* | 10/2008 | Buerge et al. ............ 719/317 |
| 2008/0298342 A1* | 12/2008 | Appleton et al. ............ 370/351 |
| 2008/0313648 A1* | 12/2008 | Wang et al. ............ 719/315 |
| 2009/0204886 A1* | 8/2009 | Xu et al. ............ 715/234 |

OTHER PUBLICATIONS

Collin Jackson and Helen J. Wang, "Subspace: Secure Cross-Domain Communication for Web Mashups", May 8 2007, International World Wide Web Conference, pp. 611-619.*

* cited by examiner

*Primary Examiner* — Laurie Ries
*Assistant Examiner* — Zaida I Marrero
(74) *Attorney, Agent, or Firm* — Fish & Richardson P.C.

(57) ABSTRACT

The subject matter of this specification can be embodied in, among other things, a method that includes generating, within a web-accessible document, a parent container document associated with a first Internet domain and one or more child container documents within the parent container document and associated with a second Internet domain. The method also includes receiving, by the parent container document, information requested from a server associated with the first Internet domain, and communicating the information from the first Internet domain to the second Internet domain using the parent container document associated with the first Internet domain to transmit the information to the one or more child container documents associated with the second Internet domain.

25 Claims, 6 Drawing Sheets

CROSS-DOMAIN COMMUNICATION

TECHNICAL FIELD

This specification relates to communications between different Internet domains.

BACKGROUND

With the advent of Web 2.0, Internet applications that combine content from more than one source are becoming more common. In some implementations, the Internet applications are web pages having embedded JAVASCRIPT applications that display the content to a user when a user views the web page with an Internet browser.

Some browsers incorporate security models that limit communication between different Internet domains. For example, a web application on Internet domain A can make a request for information from a server on Internet domain B, but cannot receive the response back to an application associated with Internet domain A (instead, the response is sent to an application or element associated with Internet domain B). This may prevent the application associated with Internet domain A from manipulating or displaying the requested information.

SUMMARY

In general, this document describes interdomain communications.

In a first general aspect, a computer-implemented method is described. The method includes generating, within a web-accessible document, a parent container document associated with a first Internet domain and one or more child container documents within the parent container document and associated with a second Internet domain. The method also includes receiving, by the parent container document, information requested from a server associated with the first Internet domain, and communicating the information from the first Internet domain to the second Internet domain using the parent container document associated with the first Internet domain to transmit the information to the one or more child container documents associated with the second Internet domain.

In a second general aspect, a computer-implemented method is described. The method includes receiving information requested from a first Internet domain at a container document associated with a web-accessible document hosted at a second Internet domain, generating, using the container document, one or more child container documents that are associated with the second Internet domain, and passing the information from the container document to the one or more child container documents associated with the second Internet domain for access by the web-accessible document.

In a third general aspect, a system is described. The system includes a container generator to generate, for a web-accessible document, a parent container document associated with a first Internet domain and one or more child container documents within the parent container document and associated with a second Internet domain. The system also includes an interface for receiving, by the parent container document, information requested from a server associated with the first Internet domain, and means for communicating the information from the first Internet domain to the second Internet domain by transmission of the information from the parent container document to the one or more child container documents The systems and techniques described here may provide one or more of the following advantages. First, interdomain communication can be simplified using a JAVASCRIPT library that can be referenced by a pointer embedded in a web page. Second, interdomain communication can be accomplished without hosting a file on a web server requesting the communications. Third, interdomain communications using a single request and response can be executed. Fourth, interdomain communications is accomplished without restrictions on the size of information passed between two Internet domains. Fifth, the speed of interdomain communication can be increased by using iframe content requests for cached files.

The details of one or more implementations of the interdomain communication feature are set forth in the accompanying drawings and the description below. Other features and advantages of the interdomain communication feature will be apparent from the description and drawings, and from the claims.

DESCRIPTION OF DRAWINGS

Like reference symbols in the various drawings indicate like elements.

DETAILED DESCRIPTION

This document describes systems and techniques for communications between different Internet domains. In some implementations, a web page hosted on a first Internet domain can include JAVASCRIPT (or a pointer to JAVASCRIPT hosted elsewhere) that initiates a request for information hosted on a second Internet domain. Applications, such as JAVASCRIPT applications, hosted on the web page at the first domain can receive this information for manipulation or display.

In some implementations, inline frames (or iframes) are used for interdomain communications (also referred to as cross-domain communications). For example, an iframe associated with an Internet domain "foo.com" can request information, such as a user's calendar data, from a server at a second Internet domain "bar.com." The server at bar.com returns the requested calendar data to the iframe, which is then associated with bar.com. The iframe can generate child iframes that are associated with foo.com, and the iframe can pass the information to the child iframes, where the information is available to objects hosted at foo.com, such as a JAVASCRIPT application that integrates and/or modifies the user's calendar data and displays it on the webpage.

Figure 1:
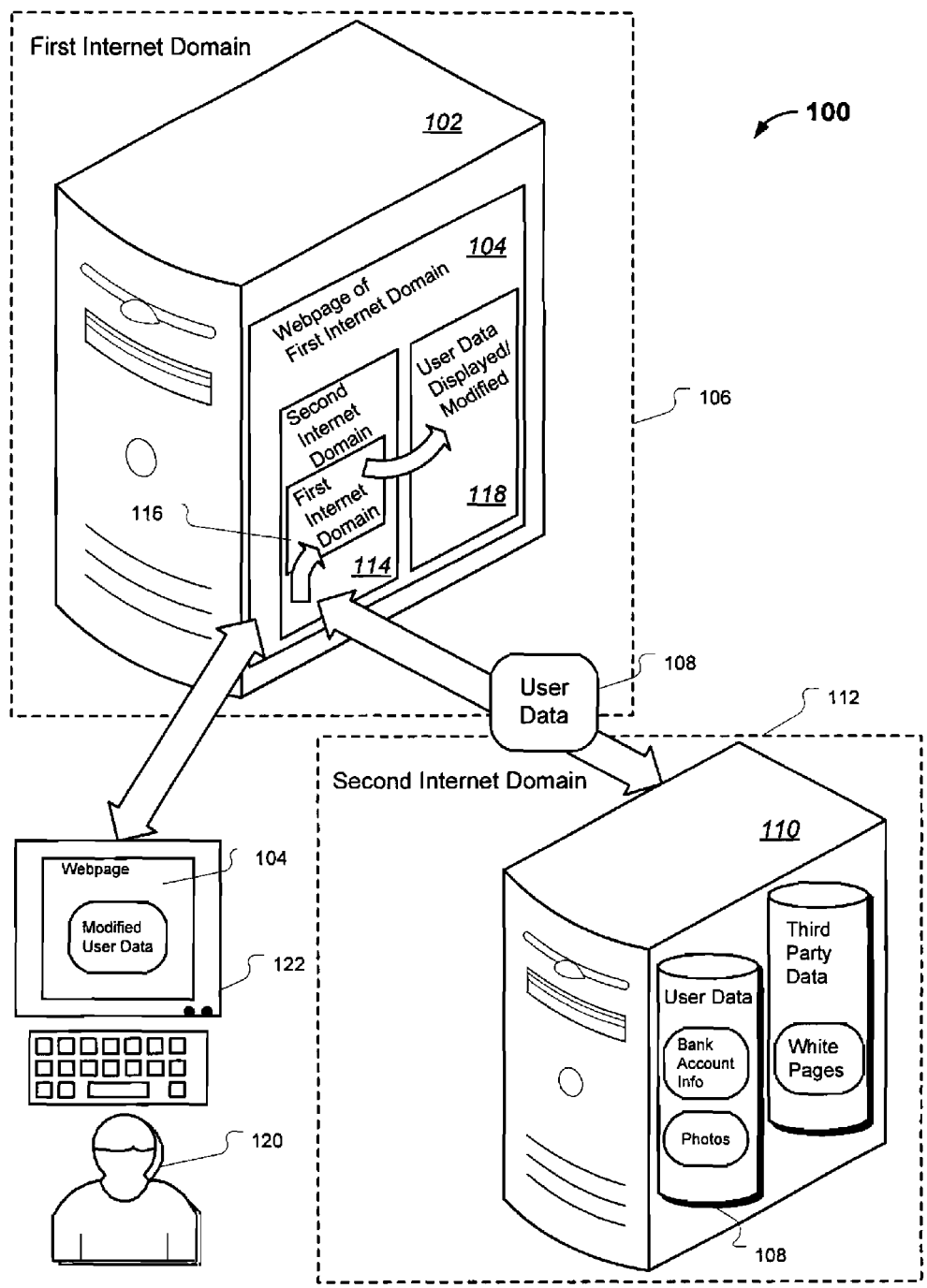
FIG. 1 is a schematic diagram of an exemplary system for communicating information across different Internet domains.

FIG. 1 is a schematic diagram of an exemplary system 100 for communicating information across different Internet domains. The system 100 can include a web server 102 that hosts a web page 104 at a first Internet domain 106. Content documents within the web page 104 can request and receive information, such as user data 108, from a data server 110 associated with a second Internet domain 112.

The content documents within the web page that facilitate communication between different Internet domains can include web page elements used to contain content (regardless of whether the content is displayed or accessible to a user viewing the website). For example, the content documents can include iframes, frames, and xframes. For the purposes of illustration, the content documents are explained in terms of iframes, although the use of iframes in the description is not intended to be limiting.

The web server 102 can make the received information available to applications, such as a JAVASCRIPT application 118 embedded in the web page 104, running on the first Internet domain 106. The web server 102 can make this information available by passing the received information from content documents associated the second Internet domain 112 to a content document associated with the first Internet domain 106. The application 118 can manipulate and display the information to a user 120 viewing the web page 104 on a client 122 as illustrated in FIG. 1.

In the exemplary system 100, the content document 114 embedded in the web page 104 is configured to receive content from the second Internet domain. The content document 114 (now referred to as the parent content document 114 for clarity) can generate child container documents that are associated with the first Internet domain 106 that is hosting the web page 104. The received content can then be passed from the parent container document to the generated child container documents 116. The web page 104 (or the application 118 embedded in the web page 104) can request the content from the child container documents 116 because the application 118 and the child container documents 116 share the same domain, namely, the first Internet domain 106.

In some implementations, applications on the first Internet domain 106, such as the application 118, can access and manipulate the data from the data server 110 even though different Internet domains host the data server 110 and the application 118. For example, the application 118 can receive the user's calendar data and use it in a JAVASCRIPT application, which can modify and display the calendar data to the user 120. The user 120 can direct a browser on the client 122 to the web page 104. When the browser executes the web page 104, the web page 104 using, for example, JAVASCRIPT, initiates cross-domain communications, and a JAVASCRIPT application receives a user's calendar data for display by the web page 104.

In the examples described above, the data requested during cross-domain communications included a user's data. For example, a user may have information, such as photos, calendar dates, contact information, bank account information, insurance information, email, etc., stored at the data server 110. In some implementations, the web page 104 may be able to access this user data after obtaining permission from the user. For example, the web page 104 can direct a user to the data server 110 so that the user can authorize the web page 104 to access the information stored at the data server 110. The data server can provide the web page with a token that evidences the user's permission for the web page to access the user's data.

In other implementations, the data server can include data that is not originated by or related to the user, such as third party data 124. For example, the third party data can include dictionary definitions, public records information (e.g., white pages), the content of other web pages or blogs, etc. After the cross-domain request and receipt of the third party information, an application embedded in the web page can manipulate the third party information. For example, if the third party information includes names and phone numbers, such as in the white pages, the application may combine and present the names and numbers to a user. The user can select a name, and a telephony application hosted at the web server 102 can dial the associated number so that the user can speak to the selected person, for example, through a microphone at the client.

Figure 2:
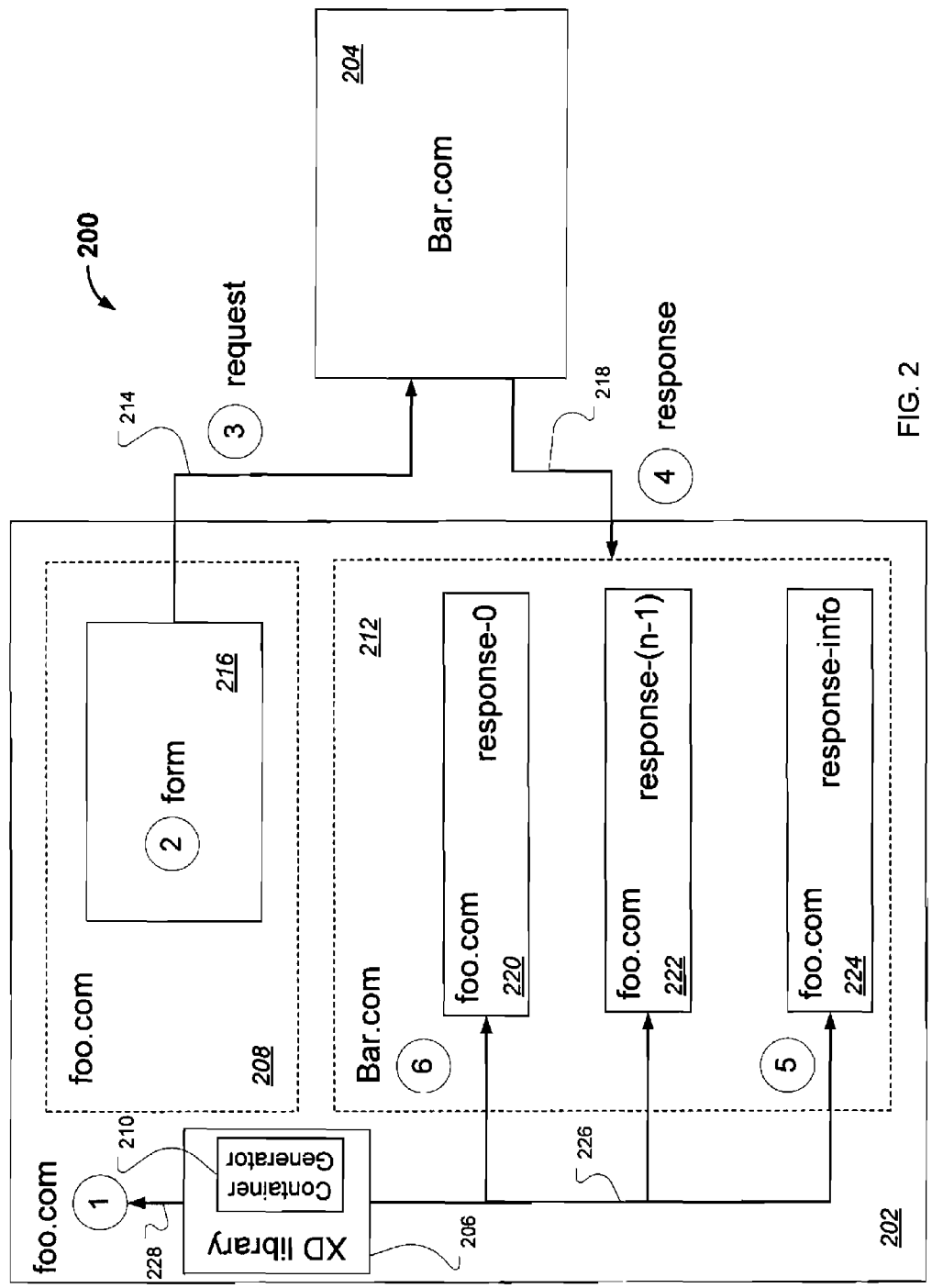
FIG. 2 is a box diagram of an exemplary system showing more detailed interactions between two servers that are hosted on different Internet domains.

FIG. 2 is a box diagram of an exemplary system 200 showing more detailed interactions between two servers that are hosted on different Internet domains. The system 200 can include a server at a first Internet domain, which is referred to as "foo.com" 202 for the purposes of illustration. Applications hosted at foo.com 202 can use content documents, such as iframes, to receive information from a different Internet domain, such as the Internet domain "bar.com" 204. In some implementations, executable code, such as JAVASCRIPT embedded in a web page, can generate the iframes and handle portions of the cross-domain communication.

The cross-domain communications can start when a user navigates to foo.com 202 using an Internet browser. In this example, foo.com 202 hosts a hypertext markup language (HTML) document, or web page, that incorporates a uniform resource identifier (URI) that points to a JAVASCRIPT library used for cross-domain communications. This library is represented in FIG. 2 as the XD library 206, and the functions defined by the library can be executed by the Internet browser viewing the web page.

In certain implementations, the browser calls the library to generate an iframe 208 that is associated with the foo.com Internet domain. More specifically, a container generator 210, included in the library can generate the iframe along with the iframe's properties. For example, the code within the library can specify that the iframe have an attribute of "hidden" so that the if rame is not visible when the browser displays the web page.

The library also can initiate a request for information from bar.com 204 using elements associated with the iframe. For example, functions within the library can generate an HTML form element 216 that has a method=POST attribute that transmits a request for information to bar.com using an HTTP post request. Use of the HTTP post transaction can permit an unrestricted amount of data to be included in the request for information. In another example, the HTML form element 216 can transmit the request for information using a method=GET attribute. A form element 216 having a method=GET attribute can append data used to specify the requested information to a URI (in this case bar.com). Functions within the library can place the URI and appended data in the form element 216's ACTION attribute, which uses the URI to specify bar.com as the server to process the information request submitted by the form element 216. In some implementations, the browser executing the form element 216 (or "form" 216) can have browser limitations that restrict the size of data included in the ACTION attribute.

In some implementations, the requested information can be specified using data, or parameters, included in the form's fields (or directly in the POST or GET transactions). For example, if the request is for a user's photographs stored at bar.com, the parameters may specify a token authenticating the request as authorized by the user, an identifier that specifies the user's account, a particular album from which to retrieve the photographs, how many photographs to retrieve, size limits for photographs retrieved, etc.

An arrow 214 indicates the submission of the request for information from, for example, the form 216 to bar.com 204. In some implementations, after submitting the form 216, the browser can associate the iframe 208 with the Internet domain bar.com. The iframe having the new association is represented by the separate dashed box 212 in FIG. 2. The browser may make this association as part of a standard browser behavior, where a content document, such as the iframe, is associated with an Internet domain from which it requests content.

In some implementations after the request for information is submitted, for example, by executing functions within the XD library 206, a polling process can begin, which checks for the existence of additional child container documents within the iframe 212. In some implementations, the child container documents are child iframes. For example, the XD library 206 can generate the child iframes in response to a receipt of the requested information from bar.com 204. The presence of a child container document can indicate that the requested information has been received and is accessible to web pages, applications, or other executable instructions that are associated with foo.com 202.

Bar.com 204 can fulfill the request for the information using parameters included in the request, for example, the number of photographs to retrieve. The return of the requested information is indicated by an arrow 218. In some implementations, the requested information can be passed within a single element, such as in a <SRC> tag of a document (referred to as to "response page") that is returned in response to the requested made by the iframe 212 now associated with bar.com. For example, the server at bar.com 204 can pad the URI of the <SRC> attribute of the response page that the server sends to the iframe 212. In FIG. 2, the server appends the URI that specifies the bar.com domain with the requested information.

In other implementations, the requested information can be passed within other elements, such as name attribute, the language attribute, or the ID attribute.

In some implementations, executable code at foo.com 202 can generate one or more child container documents, such as child iframes that are associated with the foo.com domain. The received information can be transmitted to the child container documents. For example, the response document can use the XD library 206 to generate child iframes within the iframe 212 (now referred to as the "parent iframe 212" for purposes of clarity) associated with bar.com.

In other implementations, executable code that generates the one or more child container documents can be hosted on a third party server and can be referenced. For example, a response page returned from bar.com can reference the XD library 206 hosted on the third party server in order to perform the described functions.

In some implementations, the parent iframe 212 can pass the information to one or more child iframes by including the information in a <SRC> attribute of the generated child iframes. For example, the response page can use the XD library to create a child iframe and point its <SRC> attribute to a nonexistent file on the foo.com domain. The response page also can, for example, append the information received from boo.com to the URI, so that the format of the URI included in the <SRC> attribute is http://foo.com/non-existent#${information request from boo.com}.

In some implementations, the server at foo.com to returns an error page that has the domain foo.com when the above URI for a non-existent page is used in the <SRC> attribute.

In other implementations, the response page can point the child iframe's <SRC> attribute to a file existing on foo.com, such as an image file or a Cascading Style Sheets (CSS) file. This, in some implementations, can save time when generating the child container documents because the browser does not have to make a request from the server at foo.com if the specified file has already been cached by the browser. If the browser has cached the content specified in the <SCR> attribute of the child iframe, the browser can return it from local storage instead of requesting it from the web server.

In another implementation, the response page can point the child iframe's <SCR> attribute to a file that has a high likelihood of existing on foo.com. For example, for a browser like Firefox (available from Mozilla Corp. in Mountain View, Calif.) and Safari (available from Apple, Inc. in Cupertino, Calif.), where accessing a non-existing page results in a error page response, instead of requesting a "non-existent" resource, the child iframe can point to a "robots.txt" file hosted on that domain (e.g., "http://foo.com/robots.txt"). The rebots.txt file may exist on many domains to inform search engines whether and what web pages can be indexed on the domain.

In another example, for a browser like IE, where accessing a non-existing page results in an error, the response page can point the child iframe's <SCR> attribute to the current page as the dummy resource. The current page can be executed so that an initialization function (e.g., init 0 function) that starts the described interdomain communication is called by the XD library when the page is loaded. However, if the XD library detects that the call is made from an iframe, the initialization function is skipped. In another implementation, if the XD library detects that the call is made from an iframe, the iframe can be prevented from loading the page entirely.

In certain implementations, the child container documents have attributes specifying they should not be visible. For example, if a child iframe has an attribute specifying that it is "hidden," a user would not see the error page or the requested file returned to the child iframe. In another example, if a parent iframe has an attribute specifying that it is hidden, any child iframes contained within the parent iframe are automatically hidden as well.

In some implementations, the browser running on the client 122 may have limitations on the amount of data that can be included in the URI. In this situation, the requested information can be fragmented and additional child container documents can be generated, where each of the child container documents receives a piece of the fragmented information.

For example, the browser may have a limitation that prohibits data exceeding 4 k from being passed using the <SRC> attribute. If the received information is 13 k, then the parent iframe 212 can generate 4 child iframes. The parent iframe 212 can use the XD library to fragment the received information into 4 fragments –4 k, 4 k, 4 k, and 1 k. Each fragment can be passed to a child iframe. FIG. 2 illustrates one implementation where the XD library 206 transmits the fragments of information to the child iframes "response (0)" 220 through "response (n–1)" 222.

In some implementations, information can be generated that specifies how many fragments of information exist. For example, the XD library 206 can create an additional child iframe "response-info" 224 that includes information about the response including how many fragments the response is broken into, the order into which the fragments should be assembled, formatting requirements for the assembled information, error-checking information, the starting and ending points of individual files, etc. within the assembled (or unassembled) information, etc.

After the child or child container documents are generated, in some implementations, applications hosted on foo.com can retrieve the information. The web page (or another set executable instructions) executed by the browser can initiate a polling process to determine whether one or more of the child container documents are available.

For example, the web page can poll to determine whether the iframe response-info 224 exists. If so, the web page can retrieve the information from each of the child iframes because the child iframes share the same Internet domain, namely, foo.com. Some browser implementations may permit this intra-domain communication.

FIG. 2 shows the retrieval of information from the child iframes, as indicated by an arrow 226. In this implementation, the XD library retrieves the information from the child iframes and assembles it. The information is then passed to the web page (or other applications) hosted on the foo.com as indicated by an arrow 228.

The web page can assemble the retrieved information from each of the child container documents based on information, for example, stored in iframe response-info 224. The web page can access the child frames using hierarchical element calls, for example, iframe[i].iframe[j], where iframe[i] is one of the parent iframes associated with bar.com and iframe[j] is one of the child iframes associated with foo.com.

In some implementations, after assembly, the web page manipulates the information. For example, the web page can use the information in an application hosted on foo.com, such an online photo-editing program embedded in the web page and displayed to a user. The application can present the photo to a user who can, for example, apply filters, crop the photo, remove red-eye, etc.

In some implementations, the modified data then can be uploaded to the source from which it was obtained. For example, an iframe, such as the iframe 208 associated with foo.com can upload the edited photos back to bar.com using the form 216 to submit the information along with instructions specifying how bar.com should use the photos (e.g., store the photos or replace the originals). The form 216 can submit the photo data in a substantially similar way as the photos were requested. For example, the photo data can be transmitted using the method=POST function of the form 216.

Figure 3:
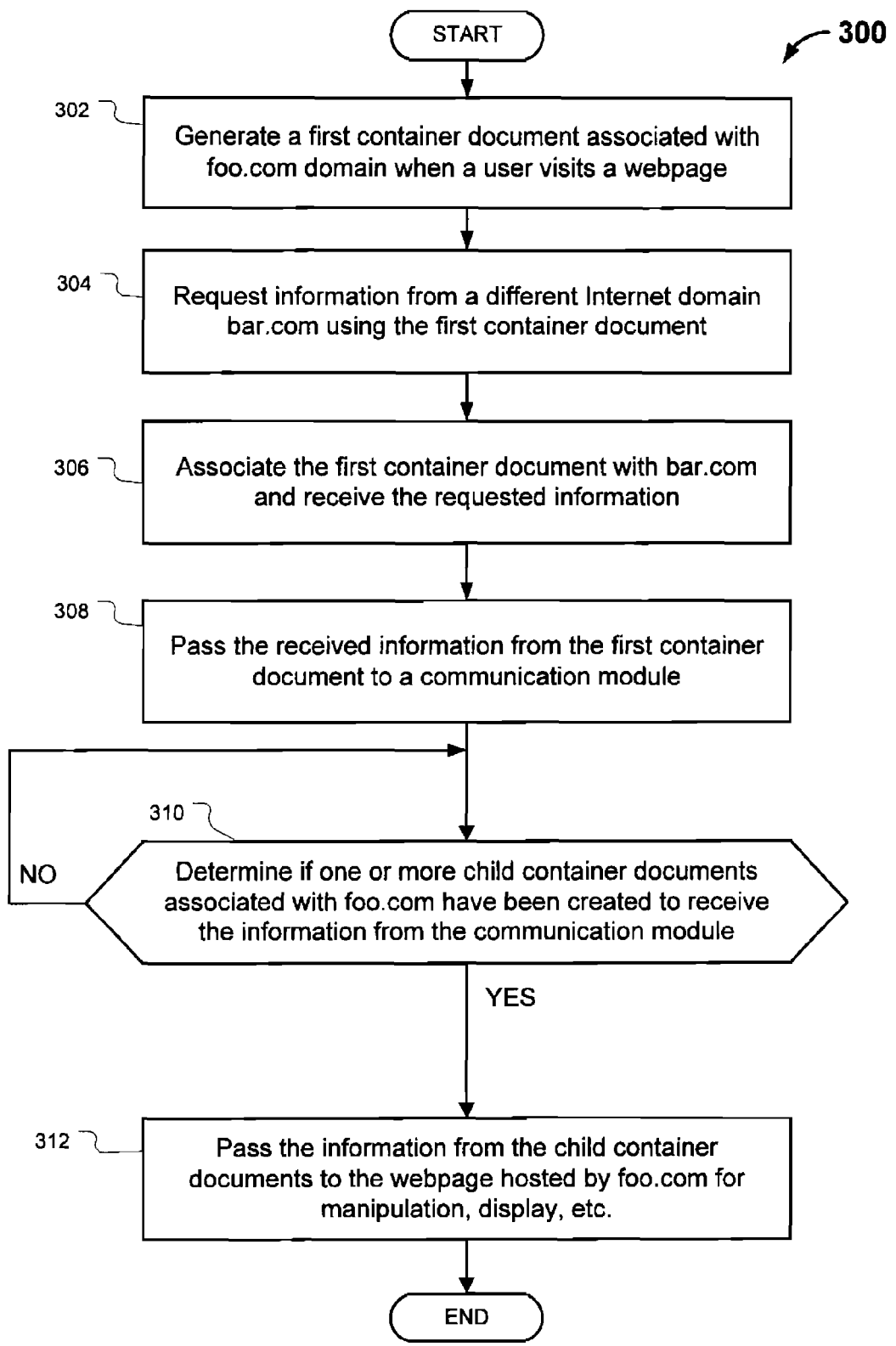
FIG. 3 is a flow chart of an exemplary method for interdomain communications.

FIG. 3 is a flow chart of an exemplary method 300 for interdomain communications presented in a summary fashion for clarity. A web server, a browser at a client, or a combination of both can execute the method. The method 300 starts in step 302, where a first container document is generated. For example, the browser can execute JAVASCRIPT code on a web page that generates a parent iframe with a hidden attribute. The parent iframe can be initially associated with the domain that is hosting the web page.

In step 304, information can be requested from a second Internet domain that is different from the one hosting the web page. For example, the parent iframe can use a HTML form to request information from the second Internet domain.

In step 306, the information can be received by the first container document. For example, the browser can associate the parent iframe with the second Internet domain. The parent iframe can receive the information as part of a padded URI of a <SRC> attribute of a response page returned by a server at the second Internet domain.

In step 308, the information can be passed from the first container document to a communication module. For example, the parent iframe can call a JAVASCRIPT application that has a communication module (defined by executable functions) that stores the information. The JAVASCRIPT application may be part of a library that is reference by the web page or directly within the parent iframe.

In step 310, a determination is made regarding whether child container documents have been created. For example, the parent iframe associated with the second Internet domain can use the XD library to generate child iframes associated with the first Internet domain (the one which hosts the web page). The parent iframe can generate one or more child iframes based on the URI limits of the browser accessing the web page.

If the information received from the second Internet domain is larger than the URI limits of the browser, the parent iframe can use the XD library to fragment the information into chucks that are equal or less than the URI limits. After fragmentation, the communication module can pass each chuck to a child iframe. If the child iframes exist, the method 300 moves to step 312. If the child iframes do not exist (or information about the frames, such as the iframe response-info do not exist), step 310 is repeated until the child iframes are available.

In step 312, the information received from the second Internet domain is transmitted from the child container documents to one or more applications hosted on the first Internet domain. For example, the web page can use the XD library to retrieve and reassemble the information stored in the child iframes. In some implementations, the web page hosted on foo.com can directly access the information held by the child iframes because the child iframes and the web page are associated with the same Internet domain. The web page can then manipulate and display the retrieved information to a user viewing the web page. Next the method 300 can end.

Figure 4:
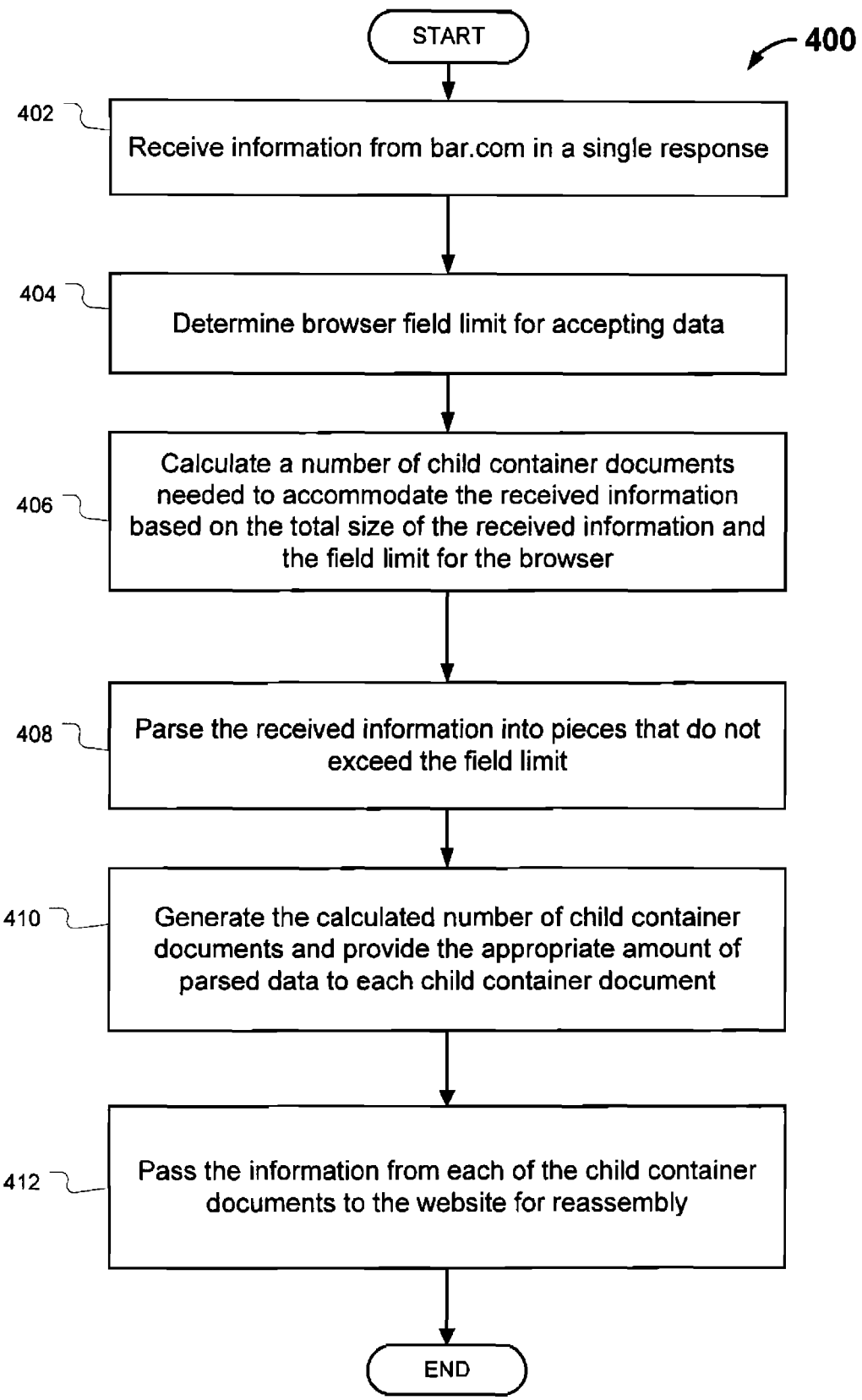
FIG. 4 is a flow chart of an exemplary method for communicating between different Internet domains while avoiding size restrictions.

FIG. 4 is a flow chart of an exemplary method 400 for communicating between different Internet domains while avoiding size restrictions. In some implementations, a web server, a client having an Internet browser, or a combination of both can execute the method 400.

The method 400 can begin in step 402 when information requested from a second Internet domain is received at a first Internet domain, as described previously (e.g., in association with step 306). In some implementations, this information can be included in a single response. For example, a data server at bar.com can return request information to a web server at foo.com in a <SRC> attribute of a single response page. For example, some internet browsers, such as Internet Explorer permit unlimited URI lengths following the character "?" in the <SRC> attribute. The "?" requests can be used to make requests to a remote server and can be substantially unlimited in length.

In step 404, it may be determined whether a browser limits exists that prevents the received information from being passed to child container document. For example, a parent iframe can receive the response page. The parent iframe can be associated with the second Internet domain and may not be able to share information with applications hosted at the first Internet domain. Instead, the parent iframe can generate a child iframe that is associated with the first Internet domain and pass the information to the child iframe.

In some implementations, Internet browsers—which are viewing the web page that has the iframes—can have size limitations that prevent passing data from a parent to a child iframe if the data exceeds the size limitations. For example, an internet browser can limit the amount of data based after a "#" character in a <SRC> field. The "#" requests can be used when passing information within a client browser.

The Internet browsers and their associated limits can be stored in a file accessible to the XD library, for example. The XD library can determine the browser type based on the request for the web page and may use the file to determine whether the identified browser has any browser limitations.

For example, the XD library can determine that the requesting Internet browser is Microsoft's Internet Explorer (IE) Version 6 (available from Microsoft Corp., located in Redmond, Wash.) based on information received in the requests for the web page from the web server. The XD library can access the file to determine that this version of IE has URI handling capabilities that are limited to 4 k of information.

In step 406, a number of child container documents needed to accommodate the information from the second Internet domain is calculated. For example, the XD library can divide the total size of the received information by the URI handling capabilities of the browser to determine how many child iframes to generate.

In step 408, the received information is fragmented into portions that do not exceed the data handling capabilities of the browser. For example, the parent iframe can call the XD library to divide the received information into fragments that are equal to or less than the data limitations of the identified browser requesting to view the web site.

In step 410, the child container documents are generated and provided the fragmented information. For example, the parent iframe can generate the number of child iframes as determined in step 406. The parent iframe can request that the XD library pass the fragments of the information from the parent iframe to the child iframes.

In step 412, the information is passed from each of the child container documents to the website. For example, the website at the first Internet domain can poll for the existence of one or more child iframes created by the parent iframe. Once the existence is detected, the website can access the XD library to retrieve and reassembly the information stored in each of the child iframes.

For example, the information can be appended to a URI within a<SRC> attribute of each iframe. The XD library can parse the URI until it identifies a portion that includes the information from the second Internet domain. It can retrieve this information and combine it with information extracted from the other child iframes (if additional child iframes exist). The web page can access the information for manipulation or for display to the user viewing the web page. Next, the method 400 can end.

Figure 5A:
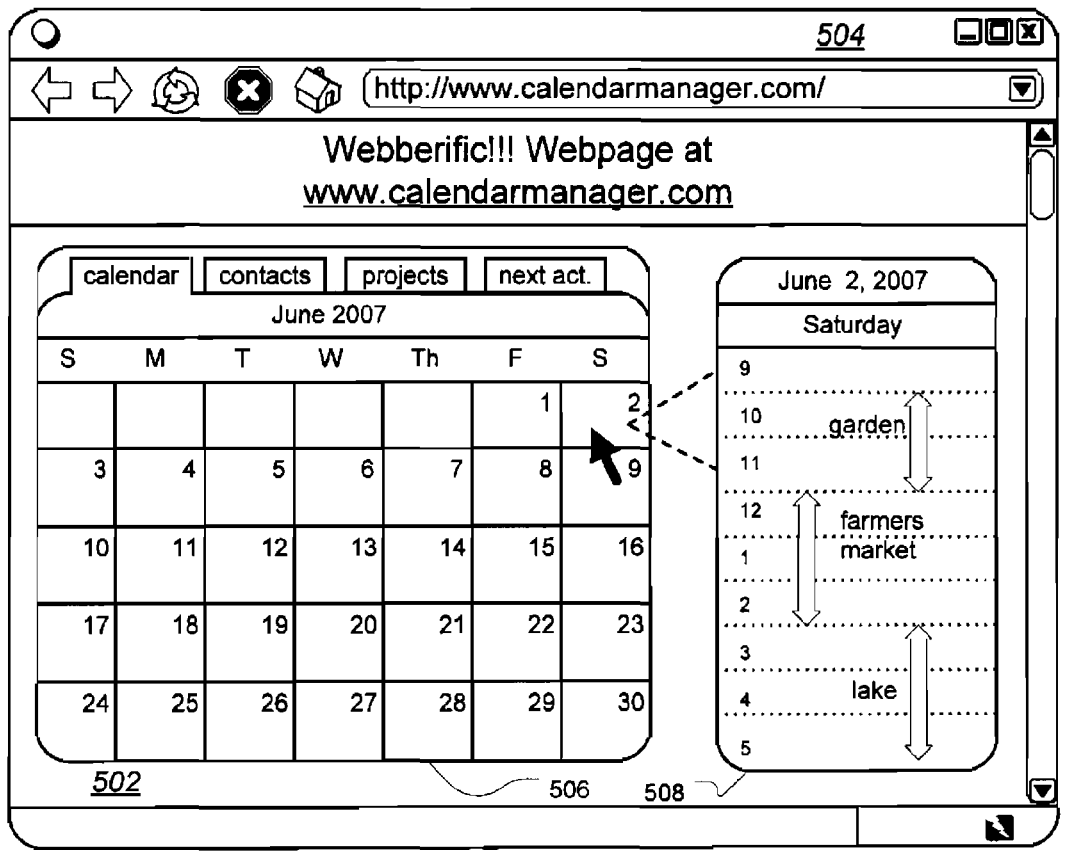
FIGS. 5A and 5B are an exemplary screenshot of a webpage that modifies and displays information hosted on a different Internet domain and a schematic of exemplary components used to generate the webpage, respectively.
Figure 5B:
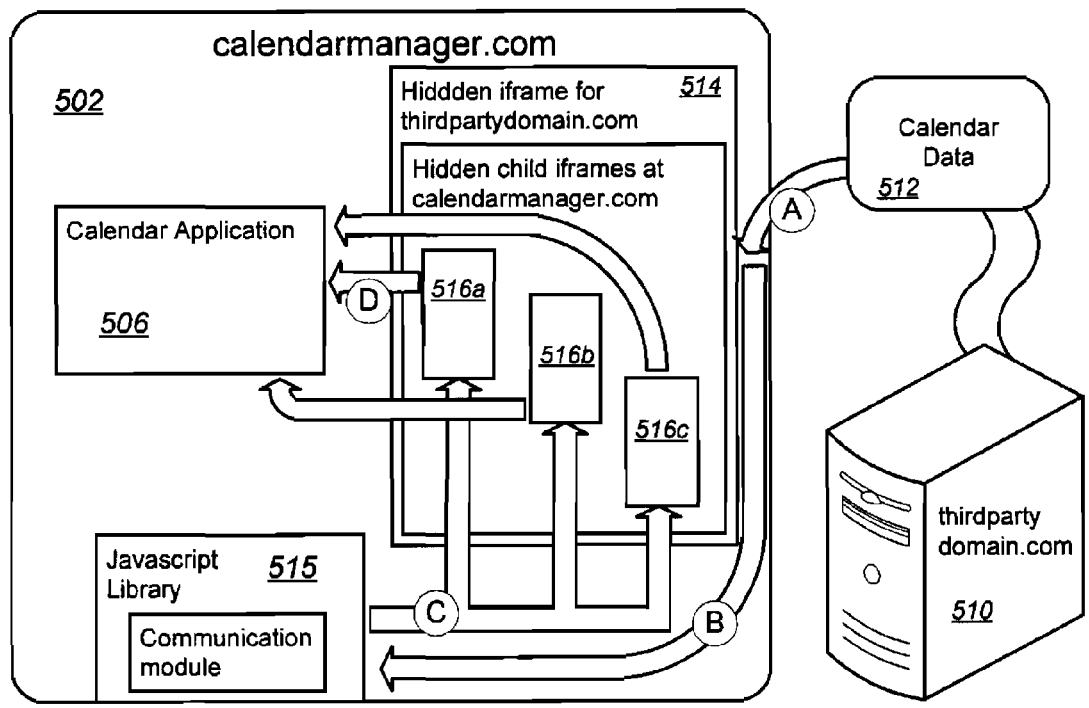

FIGS. 5A and 5B are an exemplary screenshot of a webpage that modifies and displays information hosted on a different Internet domain and a schematic of exemplary components used to generate the webpage, respectively. FIG. 5A is an exemplary screen shot of a web page 502 hosted at an Internet domain CalendarManager.com. A user can use the browser 504 to load or execute instructions embedded in the web page 502, such as JAVASCRIPT instructions that initiate cross-domain communications between a web server hosting the viewed web page and, for example, a data server having the user's calendar data.

In some implementations, the user authorizes the web server to retrieve the user's data from the data server. A day planner application embedded in the web page can receive the information using the interdomain communications discussed previously and can display this information to the user. In FIG. 5A, the application 506 displays the calendar data so that a user can see a summary of each day within a month. When a user selects a day, for example, with a mouse pointer, the day can expand with a more detailed view as shown in expanded day 508. The application can modify, for example, the format of the data so it can have different colors, fonts, sizes, etc. based on when an event occurs, whether events overlap, etc.

The application 506 can integrate data from several data servers. For example, the application 506 has several tabs, such as a calendar tab (which is currently selected), a contacts tab, a projects tab, and a next action tab. Each of these tabs may display data that is gathered from different data servers and integrated into the single application 506 displayed on the web page 502. For example, the application can obtain the content displayed in the contact tab from an email server that stores email contact information for the user.

FIG. 5B shows a schematic diagram of elements used to generate the application 506 embedded in the web page 502. For example, in response to a request for calendar data, a server 510 at ThirdPartyDomain.com returns the calendar data 512 as indicated by an arrow labeled A. A hidden parent iframe 514 associated with the ThirdPartyDomain.com receives the calendar data and calls a JAVASCRIPT library to 515 to receive the calendar data (indicated by an arrow labeled B) and generate three hidden child iframes 516 (as indicated by an arrow labeled C), where each child iframe is associated with the CalendarManager.com domain.

The parent iframe uses the JAVASCRIPT library 515 to fragment the calendar data based on the browser 504's URI handling capabilities and passes fragments of the calendar data to the child iframes. The calendar application 506 hosted on CalendarManager.com then can access the calendar data by calling the XD library to assemble the data within the child iframes also associated with CalendarManager.com and pass the calendar data to the application 506. The calendar application can then manipulate and display the calendar data as described above.

Figure 6:
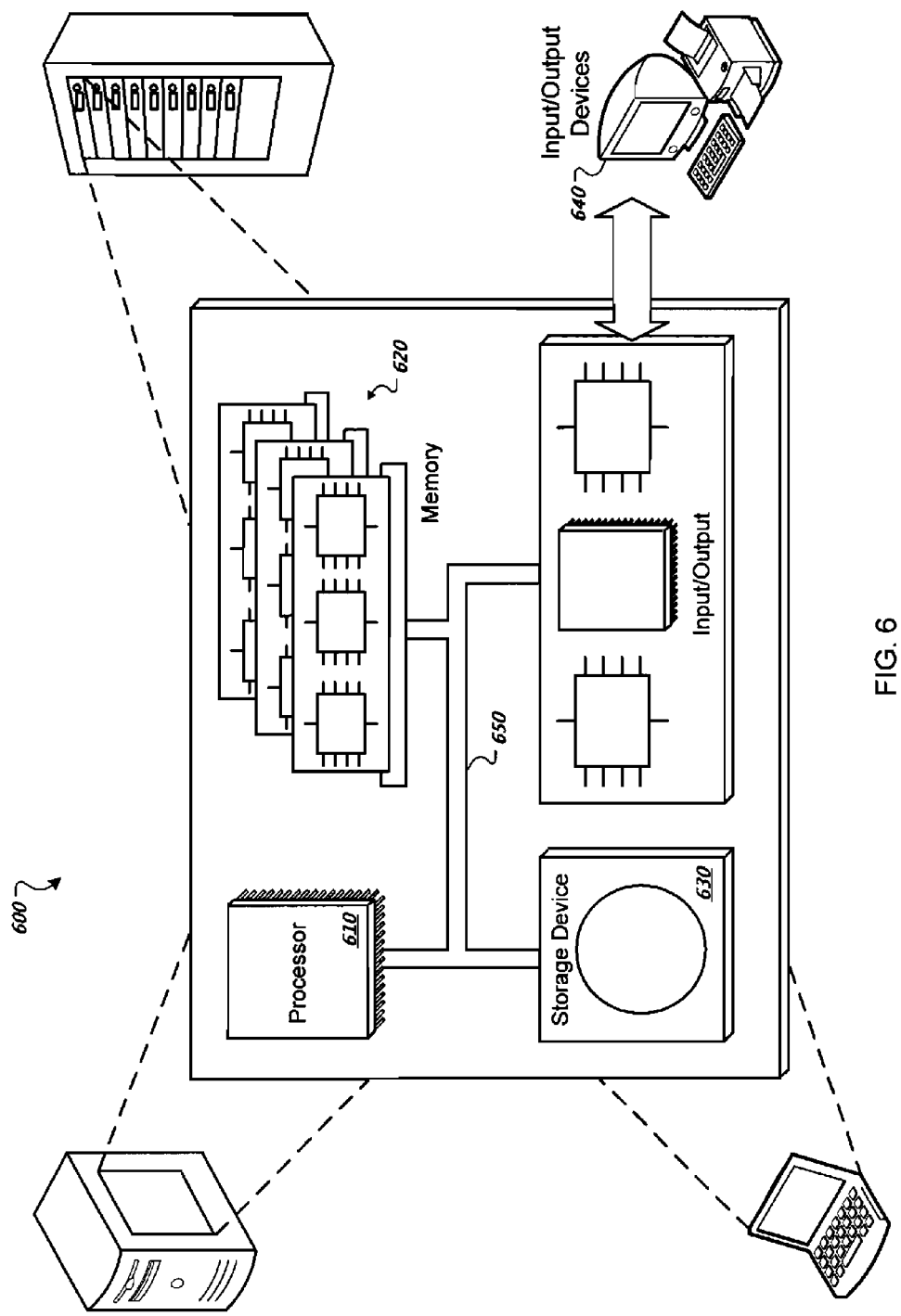
FIG. 6 is a schematic diagram of a general computer system.

FIG. 6 is a schematic diagram of a computer system 600. The system 600 can be used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 also can include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving information requested from a first Internet domain at a parent container document associated with a web-accessible document hosted at a second Internet domain;
    generating, using the parent container document, a plurality of child container documents that are associated with the second Internet domain;
    fragmenting the received information into fragments, and passing the fragments of the received information from the container document to the plurality of child container documents associated with the second Internet domain for access by the web-accessible document; and
    generating another child container document that stores information indicating, at least, a number of child container documents across which the received information has been fragmented and an order for reassembling the fragments of the received information.

2. The method of claim 1, wherein the parent container document and the child container documents comprise markup language frames, inline frames, Xframes, or a combination thereof.

3. A computer-implemented method comprising:
    generating, within a web-accessible document, a parent container document associated with a first Internet domain;
    receiving, by the parent container document, information requested from a server associated with the first Internet domain;
    determining a number of child container documents to generate by the parent container document based on a size of the received information, wherein the determination comprises comparing the size of the received information to a uniform resource identifier (URI) size limit of a client browser accessing the web-accessible document;
    fragmenting the received information into fragments that are equal to or less than the URI size limit;
    communicating, by the parent container, the received information from the first Internet domain to a second Internet domain by generating child container documents, each to receive a fragment, until each of the fragments has a corresponding child container document, wherein the child container documents are generated within the parent container document and are associated with the second Internet domain, and transmitting the fragments of the received information to the generated child container documents;

generating another child container document that stores information indicating, at least, the number of child container documents across which the received information has been fragmented and an order for reassembling the fragments;

determining, by a process that is associated with the second Internet domain and that is permitted to access the child container documents but not the parent container document, and by repeatedly polling for the existence of at least one of the child container documents, whether the received information has been communicated to the second Internet domain; and in response to determining that the received information has been communicated to the second Internet domain, retrieving from the child container documents, by the process associated with the second Internet domain, the information received from the server associated with the first Internet domain.

4. The method of claim 3, wherein the information received by the parent container document is included in a markup language attribute.

5. The method of claim 4, wherein the markup language attribute is selected from a group comprising a source (SRC) attribute, a name attribute, a language attribute, an ID attribute.

6. The method of claim 3, further comprising requesting the information from the server using a markup language form generated by the parent container document.

7. The method of claim 3, wherein the transmission of the information from the parent container document to the child container documents comprises accessing a library having executable code that fragments the information and distributes the fragmented information to the child container documents.

8. The method of claim 7, wherein the library is hosted at a first server remote from a second server that hosts the web-accessible document.

9. The method of claim 7, further comprising requesting the fragmented information from the child container documents and reassembling the fragmented information for use by an application hosted at the first Interact domain.

10. The method of claim 3, wherein the parent container document and the child container documents comprise markup language frames, inline frames, Xframes, or a combination thereof.

11. The method of claim 3, further comprising specifying for the child container documents a uniform resource identifier of content that has been cached by a browser accessing the web-accessible document.

12. The method of claim 11, wherein the cached content comprises content from the web-accessible document or the entire web-accessible document.

13. The method of claim 11, further comprising padding the uniform resource identifier with at least a portion of the information received from the server.

14. The method of claim 3, further comprising specifying for the child container documents dummy uniform resource identifiers associated with the first Internet domain, wherein the dummy uniform resource identifier is not associated with existing content.

15. The method of claim 14, further comprising padding the dummy uniform resource identifier with at least a portion of the information received from the server.

16. The method of claim 3, wherein the parent and child container documents are not visible when the web-accessible document is displayed by a browser.

17. The method of claim 3, further comprising accessing the information from the child container documents using an application hosted at the first Internet domain.

18. The method of claim 17, wherein the application executed by a browser during viewing of the web-accessible document.

19. The method of claim 3, further comprising specifying for the child container documents a uniform resource identifier of a file used to specify whether a search engine can index content on the second internet domain.

20. The method of claim 3, wherein the other child container document is generated after each of the additional child container documents have been generated; and wherein repeatedly polling for the existence of the at least one of the child container documents comprises repeatedly polling for the existence of the other child container document, and wherein existence of the other child container document indicates that the received information has been transferred to each of the additional child container documents.

21. A system comprising:

a computer-readable storage device that stores instructions; and one or more processors that are configured to executed the stored instructions, wherein execution of the stored instructions causes the one or more processors to provide:

an interface to receive information requested from a first Internet domain at a parent container document associated with a web-accessible document hosted at a second Internet domain; and a container generator to:

generate, using the parent container document, a plurality of child container documents that are associated with the second Internet domain;

fragment the received information into fragments, and pass the fragments of the received information from the container document to the plurality of child container documents associated with the second Internet domain for access by the web-accessible document; and generate another child container document that stores information indicating, at least, a number of child container documents across which the received information has been fragmented and an order for reassembling the fragments of the received information.

22. The system of claim 21, wherein the parent container document and the child container documents comprise markup language frames, inline frames, Xframes, or a combination thereof.

23. A system comprising:

a computer-readable storage device that stores instructions; and one or more processors that are configured to executed the stored instructions, wherein execution of the stored instructions causes the one or more processors to provide:

an interface for receiving information requested from a server associated with the first Internet domain;

a container generator to generate, for a web-accessible document, a parent container document associated with a first Internet domain and child container documents within the parent container document and associated with a second Internet domain, wherein a number of the generated child container documents is determined based on a size of the received information, wherein the determination comprises comparing the size of the received information to a uniform resource identifier (URI) size limit of a client browser accessing the web-accessible document, wherein the received information is fragmented into fragments that are equal to or less than the URI size limit, and wherein each of the generated child container documents receives a fragment until each of the fragments has a corresponding child container document;

wherein the container generator further generates another child container document that stores information indicating, at least, the number of child container documents across which the received information has been fragmented and an order for reassembling the fragments;

means for communicating the received information from the first Internet domain to the second Internet domain by transmission of the fragments of the received information from the parent container document to the generated child container documents; and means for determining whether the received information has been communicated to the second Internet domain by repeatedly polling for the existence of at least one of the child container documents, wherein the means for determining is associated with the second Internet domain and is permitted to access the child container documents but not the parent container document.

24. A computer program product comprising a machine-readable storage medium that stores instructions that, upon execution by a processor, cause the processor to perform operations comprising:

receiving information requested from a first Internet domain at a parent container document associated with a web-accessible document hosted at a second Internet domain;

generating, using the parent container document, a plurality of child container documents that are associated with the second Internet domain;

fragmenting the received information into fragments, and passing the fragments of the received information from the container document to the plurality of child container documents associated with the second Internet domain for access by the web-accessible document; and generating another child container document that stores information indicating, at least, a number of child container documents across which the received information has been fragmented and an order for reassembling the fragments of the received information.

25. The computer program product of claim 24, wherein the parent container document and the child container documents comprise markup language frames, inline frames, Xframes, or a combination thereof.

\* \* \* \* \*

UNITED STATES PATENT AND TRADEMARK OFFICE
CERTIFICATE OF CORRECTION

PATENT NO. : 7,979,791 B2  Page 1 of 1
APPLICATION NO. : 11/830434
DATED : July 12, 2011
INVENTOR(S) : Jun Yang et al.

It is certified that error appears in the above-identified patent and that said Letters Patent is hereby corrected as shown below:

Column 13, Line 45, Claim 9, delete "Interact" and insert --Internet--, therefore.

Signed and Sealed this
Eighteenth Day of October, 2011

David J. Kappos
*Director of the United States Patent and Trademark Office*